(12) United States Patent
Soby et al.

(10) Patent No.: US 11,418,393 B1
(45) Date of Patent: Aug. 16, 2022

(54) REMEDIATION OF DETECTED CONFIGURATION VIOLATIONS

(71) Applicant: AppOmni, Inc., San Francisco, CA (US)

(72) Inventors: Brian Soby, Carbondale, CO (US); Timothy Bach, Emeryville, CA (US)

(73) Assignee: AppOmni, Inc., San Francisco, CA (US)

( * ) Notice: Subject to any disclaimer, the term of this patent is extended or adjusted under 35 U.S.C. 154(b) by 0 days.

(21) Appl. No.: 17/385,422

(22) Filed: Jul. 26, 2021

(51) Int. Cl.
*G06F 15/177* (2006.01)
*H04L 41/0816* (2022.01)
*H04L 41/084* (2022.01)
*H04L 9/40* (2022.01)

(52) U.S. Cl.
CPC ...... *H04L 41/0816* (2013.01); *H04L 41/0843* (2013.01); *H04L 63/102* (2013.01); *H04L 63/1433* (2013.01); *H04L 63/1441* (2013.01); *H04L 63/20* (2013.01); *H04L 2463/082* (2013.01)

(58) Field of Classification Search
CPC ............. H04L 41/0816; H04L 41/0843; H04L 63/102; H04L 63/1433; H04L 63/1441; H04L 63/20
USPC ........................................ 709/221, 223, 224
See application file for complete search history.

(56) References Cited

U.S. PATENT DOCUMENTS

| 7,516,492 B1 * | 4/2009 | Nisbet .................... G06F 21/554 717/136 |
| 2015/0120931 A1 * | 4/2015 | Padala .................. G06F 9/5077 709/226 |
| 2021/0314302 A1 * | 10/2021 | Lewin ..................... G06F 9/448 |
| 2021/0344602 A1 * | 11/2021 | Lewin ................... H04L 45/123 |

\* cited by examiner

*Primary Examiner* — Liang Che A Wang
(74) *Attorney, Agent, or Firm* — Van Pelt, Yi & James LLP

(57) ABSTRACT

Remediation of detected configuration violations is disclosed, including: detecting a violation associated with a configuration at a data source server; providing a remediation corresponding to the violation; and storing an audit log that includes one or more events associated with the remediation corresponding to the violation.

18 Claims, 12 Drawing Sheets

| Detected Violations | Remediation Status | Audit Log |
|---|---|---|
| *Violation A* <br> -User_123 has been downloading a large number of files from SaaS Service Delta. | *Resolved* | -2021-06-17 at 1:32am: User_123 is temporarily denied access to SaaS Service Delta. |
| *Violation B* <br> -Detected discrepancy between a prescribed security attribute of Policy X and a configured security attribute. | Auto Remediation In Progress | -2021-06-18 at 9:15am: API commands sent to SaaS Service Epsilon at which the security attribute was configured. |
| *Violation C* <br> -Detected outage in service provided by payroll software service. | Manual Remediation In Progress | -2021-06-19 at 4:43pm: Manual remediation plan sent to Security Admin. <br> -2021-06-19 at 5:00pm: Received Security Admin's commitment to implement the manual remediation plan. |
| ... | ... | ... |

FIG. 12

REMEDIATION OF DETECTED CONFIGURATION VIOLATIONS

BACKGROUND OF THE INVENTION

Typically, when a computer-related security violation is detected, an alert is presented at a user interface or sent through a communication channel (e.g., a chat application). A user, such as a security administrator who monitors security violations by checking the user interface or by receiving the alert through a communication channel, must manually triage which violations to address and how to resolve them. However, alerts can be generated for a large volume of detected security violations and therefore become difficult for security administrators to manually manage. Furthermore, it is challenging for security administrators to track the dynamic states of detected security violations as they are combing through a potentially large number of alerts.

BRIEF DESCRIPTION OF THE DRAWINGS

Various embodiments of the invention are disclosed in the following detailed description and the accompanying drawings.

FIG. 12 is a diagram showing an example user interface for presenting information related to violations associated with an organization, Acme.

DETAILED DESCRIPTION

Figure 1:
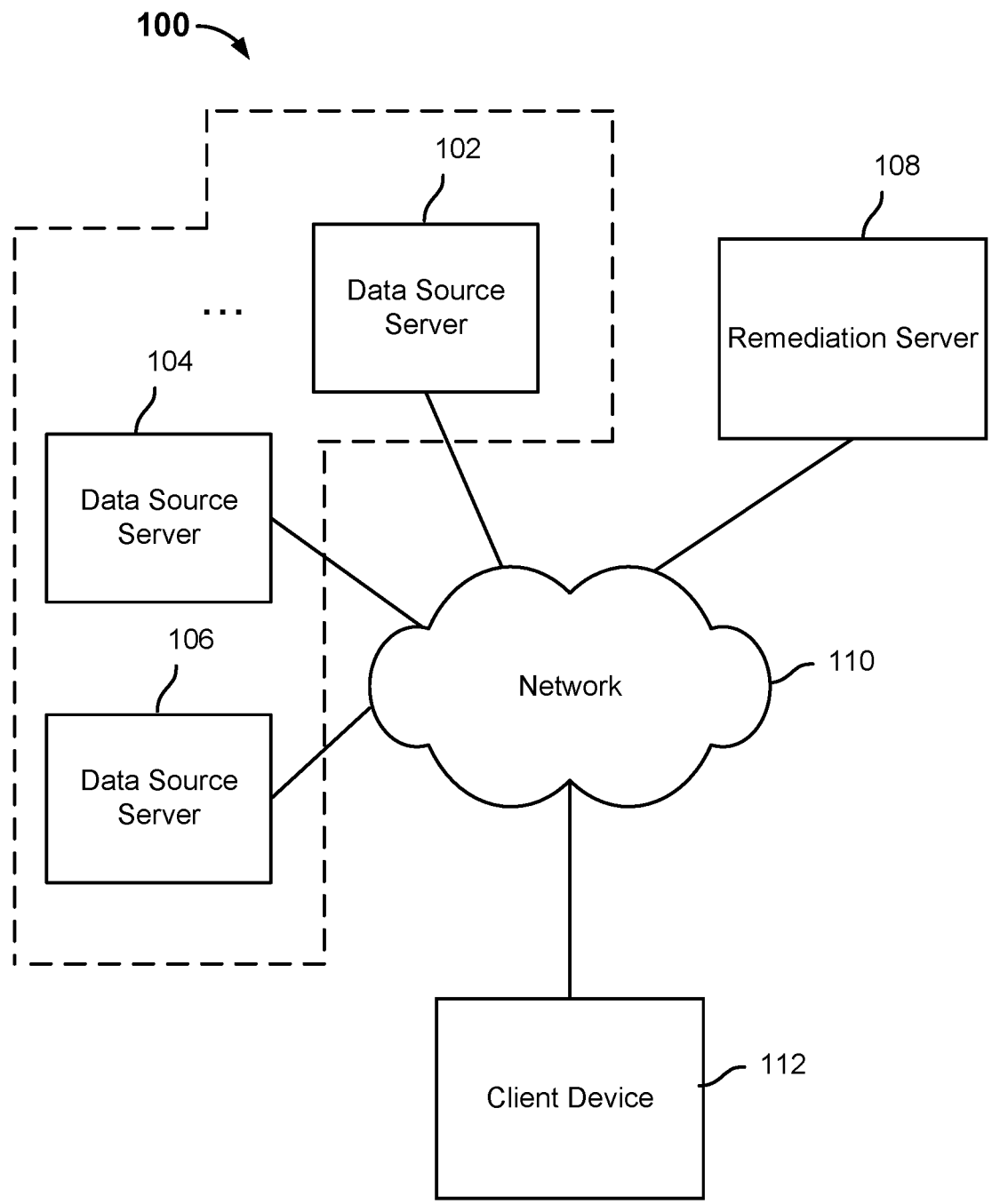
FIG. 1 is a diagram showing an embodiment of a system for remediation of detected configuration violations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of remediation of detected configuration violations are described herein. A violation associated with a configuration at a data source server is detected. In various embodiments, the violation associated with the configuration at the data source server is determined against a prescribed configuration that is described by internal reference information. For example, "internal reference information" comprises policies, rules, criteria, observed normal behavior patterns, heuristics, and best practices that are associated with an organization (e.g., an enterprise). A remediation corresponding to the violation is provided. In various embodiments, a "remediation" corresponding to the violation comprises a process of one or more steps, at least some of which are to be programmatically performed, to resolve the violation. In a first example, the provided remediation comprises transmitting a series of one or more (e.g., application programming interface (API)) commands to the data source server to cause the resolution of the violation. In a second example, the provided remediation comprises to generate a temporary or permanent modification to the internal reference information associated with the organization to render the relevant configuration no longer a violation. In a third example, the provided remediation is to provide a customized remediation plan at a user interface for a security administrator to manually implement and to programmatically prompt the security administrator to complete the customized remediation plan if the user has not done so by a stated deadline. An audit log associated with a result of the remediation corresponding to the violation is stored. In various embodiments, the audit log stores event(s) associated with the one or more steps that have been performed by the provided remediation of the violation. For example, the audit log corresponding to the detected violation tracks the sequences of events associated with who (e.g., which user(s) or programs), when, and/or why had performed steps towards remediating the violation.

FIG. 1 is a diagram showing an embodiment of a system for remediation of detected configuration violations. System 100 includes data source server 102, data source server 104, data source server 106, remediation server 108, network 110, and client device 112. Network 110 may be implemented using data networks and/or telecommunication networks. Data source server 102, data source server 104, data source server 106, remediation server 108, and client device 112 may communicate to each other over network 110.

Each of data source servers 102, 104, and 106 is configured to store elements associated with a cloud-based service or a software as a service (hereinafter referred to as "SaaS") platform. In various embodiments, at least some of data source servers 102, 104, and 106 is associated with a different SaaS platform. Examples of services provided by SaaS platforms include file storing, file sharing, customer relationship management, payroll management, employee data management, human resource data management, and financial management. For example, organizations such as enterprises may subscribe to services provided by one or more SaaS platforms to help manage their businesses. By subscribing to a SaaS platform, an actor (e.g., an administrative user) on behalf of an enterprise stores elements (e.g., personal data, customer data, employment data) with the SaaS platform at the SaaS platform's corresponding data source server. Furthermore, the administrative user on behalf of his or her enterprise is to configure security attributes with respect to the enterprise's elements at a particular SaaS. As mentioned above, in various embodiments, an "element" comprises stored data, processed data, detected data, identified data, configuration, compliance or auditing-supporting elements, and user or administrative log events. Configured security attributes may specify, for example, the types of accesses and permissions that are available to certain types of actors with respect to each subset of the elements. In various embodiments, a "configured security attribute" is a security attribute that had actually been configured at a particular data source associated with an element that is stored at, processed by, or made available through the data source. For example, sensitive elements (e.g., nonpublic data) should be configured such that only a limited number of actors (e.g., executives) within the enterprise can access such elements and public data should be configured such that most actors including both employees and even contractors of the enterprise can access (e.g., view) such elements. In various embodiments, an "actor" comprises a user, a system, a machine, an image, a process, an application, an account, or a combination of one or more of the above.

Remediation server 108 is configured to detect, for an organization or an actor thereof, a violation associated with a configuration at a data source server (e.g., such as data source servers 102, 104, and 106). Examples of configuration-related violations that may be detected by remediation server 108 may include, but are not limited to, data exposures to unauthorized parties, unwanted grants of access, unwanted system configuration settings (e.g., settings that are turned either on or off in an undesirable way), access/usage of sensitive information that should be protected by multi-factor authentication but is not, and occurrence of anomalous activity. In various embodiments, remediation server 108 is configured to detect a violation associated with an organization's configuration at a data source server by comparing the organization's actual configured setting(s) against prescribed (e.g., desired) setting(s)/configurations and detecting a violation when a discrepancy is determined between the organization's actual configured settings and the prescribed settings/configurations. For example, the prescribed settings or configurations are related to security. In various embodiments, an organization's prescribed settings or configurations are described in the internal reference information associated with the organization.

One specific example of an organization's internal reference information that describes prescribed configurations is a "policy." In some embodiments, a policy is defined by an administrative user associated with the organization to include a set of mappings to elements stored at one or more data source servers, a set of prescribed configurations (e.g., security settings), and a selected set of actors. In some embodiments, the set of actors may be selected in the policy as specified by one or more individual actors or as any actor that meets one or more specified attributes (e.g., a specified attribute is an employment status or domain name of a registered email address) associated with a "role group." In some embodiments, a policy is also defined with a policy type. For example, a policy type may be a whitelist policy (e.g., for which the policy's prescribed security attributes define the Allowed Accesses for the specified set of actors), a blacklist policy (e.g., for which the policy's prescribed security attributes define the Forbidden Accesses for the specified set of actors), or a functional policy (e.g., for which the policy's prescribed security attributes define the Required or Mandatory Accesses for the specified set of actors). As will be described below, a policy provides a reference by which remediation server 108 can monitor the current actual, proposed, theoretical, extracted, partial, or simulated configurations of security attributes with respect to the policy's set of actors within the organization's stored SaaS elements mapped to by the policy and the organization's prescribed security attributes for the same elements. Periodically or in response to an actor's instruction to perform an audit (which is sometimes also referred to as a "scan") for a policy, remediation server 108 is configured to obtain from one or more data source servers, the actual, proposed, theoretical, extracted, partial, or simulated configured security attributes corresponding to the SaaS platform elements related to the mapping(s) specified in the policy for the set of actors specified in the policy and compare those actors' actual configured security attributes to the prescribed security attributes associated with the policy in light of the policy type (e.g., whitelist or blacklist) of the policy. Any discrepancies between those actual configured security attributes and the prescribed security attributes based on the policy type can be determined by remediation server 108 as configuration related violations for the organizations. Such discrepancies generally highlight an undesirable mismatch between the enterprise's desired/intended security attributes for the set of actors specified in the policy and the enterprise's current actual, proposed, or simulated configured security attributes for the set of actors specified in the policy. These discrepancies shine a light on possible security or functional risks that warrant the organization's attention or functional deficiencies that may cause denial of service, test failure, or inability for the actor(s) to perform their required business processes or operations.

In some embodiments, a policy includes known-good or known-bad practices or configurations, practices or configurations related to external requirements such as compliance or industry benchmarks, implicitly discovered individual or combinations or configurations with the potential to introduce risk, and/or "meta rules" such as any access or configuration that has not been used in a system or by an actor over a timeframe or from a location.

Other examples of an organization's internal reference information that describes prescribed configurations include best practice criteria, customer customized policies, third party provided standards, heuristics, signatures, conditions, and normal patterns of behavior (e.g., as determined based on historical behavior).

In various embodiments, in addition to performing audits on policies associated with an organization, remediation server 108 is configured to detect configuration related violations associated with an organization by performing free-form analyses on the organization's data and/or configurations at a data source server by comparing the organization's stored data or the organization's actual configurations against prescribed configurations described in the organization's internal reference information. In some embodiments, remediation server 108 is configured to perform free-form analyses on the organization's data and/or configurations at a data source server opportunistically (e.g., in response to received indications of new configurations having been made to the data source server), in response to an actor's instruction, and/or on a regular schedule (e.g., daily).

In some embodiments, remediation server 108 can additionally detect configuration related violations associated with an organization based on messages broadcasted or queried from third-party servers. For example, a third-party server can maintain privacy ratings on SaaS platforms and/or the status of data breaches at SaaS platforms. In some embodiments, remediation server 108 can compare a message obtained from a third-party server against prescribed configurations to determine whether the message indicates that a violation has occurred (e.g., a data breach of the organization's data) at a particular SaaS platform (e.g., that is provided by a data source server).

In some embodiments, remediation server 108 can determine severity corresponding to each detected violation. In various embodiments, the "severity" corresponding to a detected violation is a value that represents the urgency/priority with which the violation should be addressed. In some embodiments, remediation server 108 is configured to first determine whether the detected violation is moot (e.g., the violating event is no longer considered a violation) or is still deemed a violation. An intervening event/action in between the detection of the violation and the determination of the violation's severity could have rendered the offending event that had caused the violation to no longer be a violation. For example, if a violation had been caused or associated with a particular actor, an intervening event/action that could have rendered the event moot is if the offending actor's account had been deactivated or if other restrictions had been placed on the offending actor's account. A violation that is deemed to be moot is not assigned a severity nor needs to be remediated and, in some embodiments, the audit log associated with that former violation could be updated to indicate its detection and the event(s) that led to it no longer being a violation. Otherwise, if it is determined that the detected violation is still deemed a violation, remediation server 108 can determine a severity corresponding to the ongoing violation based on one or more factors. Some example factors that remediation server 108 can use to compute the severity associated with an ongoing violation include one or more of, but not limited to, the following: the role of an actor associated with the violation, the activity level of an actor associated with the violation, whether restrictions (e.g., multi-factor authentication) have been placed on an actor associated with the violation, a tag (e.g., associated with the level of sensitivity) of data that is related to the violation, a compliance standard (e.g., a legal requirement) that is related to the violation, and the length of time since the detection or occurrence of the violation. In some embodiments, remediation server 108 is configured to rank the detected violations by their respective severities. For example, violations with greater severities are ranked higher (due to the greater urgency with which they should be addressed) than violations with lower severities. In some embodiments, remediation server 108 is configured to display the detected violations at a user interface (that is presented at client device 112) in a sequence that is based on their respective rankings so that violations with greater severities are more conspicuously displayed. As will be described below, in some embodiments, remediation server 108 can also use the severity associated with a violation to determine which type of remediation to perform for the violation.

Remediation server 108 is configured to determine whether to perform automatic (programmatic) remediation and/or manual remediation for each (ongoing) violation. In various embodiments, performing "automatic remediation" comprises translating the violation into one or more API commands and then sending the API command(s) to the appropriate systems to effect changes in configurations/settings. In various embodiments, performing "manual remediation" comprises generating a set of instructions (e.g., by customizing a template based on the specific values associated with the violation) and presenting the set of instructions at a user interface for a security administrator to manually carry the steps that are needed to remediate the violation. In some embodiments, remediation server 108 is configured to determine whether a violation should be remediated automatically and/or manually based on whether automatic remediation is available for that violation. For example, automatic remediation is available for a violation for which an API can be used by remediation server 108 to effect a settings change at the relevant data source server. In some embodiments, remediation server 108 is configured to determine whether a violation should be remediated automatically and/or manually based on the severity associated with the violation. In a first example, a severity threshold could be set such that violations with severities above the severity threshold are automatically remediated by remediation server 108 and violations with severities equal to or less than the severity threshold are to be manually remediated. In a second example, violations can be bucketed into two buckets by their respective severities, where the violations in the bucket associated with higher severities are determined to be automatically remediated and the violations in the other bucket associated with lower severities are determined to be manually remediated. For those violations for which remediation server 108 does not determine to automatically remediate, remediation server 108 is configured to generate and present instructions for manual remediation at a user interface to be presented at client device 112. In some embodiments, if remediation server 108 performs automatic remediation for a violation but the violation is not entirely addressed by the automatic remediation, then remediation server 108 is configured to generate and present instructions for manual remediation for the violation at a user interface to be presented at client device 112.

Remediation server 108 is configured to maintain an audit log corresponding to each violation. The audit log corresponding to a violation records each event associated with the detection of the violation and each event associated with the automatic and/or manual remediation of the violation. The audit log can be represented with each violation along with other information, such as, for example, identifying information and a current remediation status associated with the violation at a user interface that is presented at client device 112. Each event may include a corresponding timestamp.

As shown in FIG. 1, system 100 comprises a system in which configuration related violations can be detected for an organization at each one or more data source servers. The violations can then be programmatically evaluated for their corresponding severities. The violations can be ranked based on their severities and/or the severities can be used to determine the type of remediation to be performed on the violation. At least some violations are remediated automatically by remediation server 108 sending API commands to a data source server that is associated with the violation. Each event associated with the detection and the remediation of the violation is tracked in an audit log for the violation such that even after the violation has been successfully remediated (resolved), the audit log for the violation can be persisted (e.g., for a configurable period) to explain when and how the violation was addressed.

Figure 2:
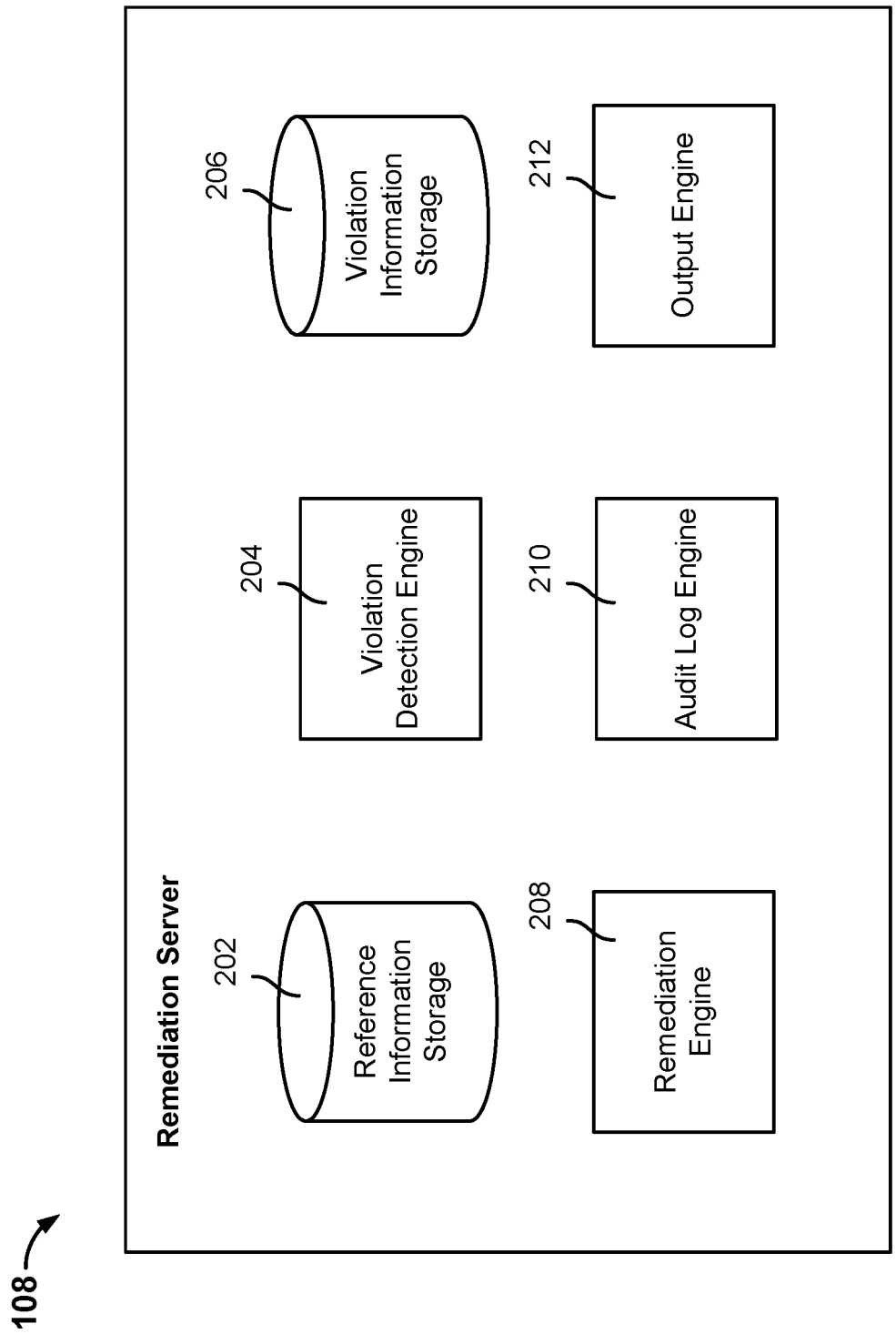
FIG. 2 is a diagram showing an example of a remediation server.

FIG. 2 is a diagram showing an example of a remediation server. In some embodiments, remediation server 108 of system 100 of FIG. 1 may be implemented using the example shown in FIG. 2. The example remediation server as shown in FIG. 2 includes reference information storage 202, violation detection engine 204, violation information storage 206, remediation engine 208, audit log engine 210, and output engine 212.

Reference information storage 202 is configured to store internal reference information that describes prescribed configurations/settings against which violations can be detected. Reference information storage 202 can store internal reference information for one or more organizations. For each organization, reference information storage 202 is configured to store internal reference information that comprises policies, rules, criteria, observed normal behavior patterns, heuristics, and best practices that are associated with that organization. In some embodiments, at least a portion (e.g., policies, which are described above) of the internal reference information may be configured by an administrator/security user associated with an organization. The internal reference information corresponding to an organization describes prescribed (desired) configurations/settings at each of one or more data source servers (e.g., where each data source server provides a SaaS service that is used by the organization). Some examples of prescribed configurations/settings at a data source server include which actors should be able to access (e.g., read, write, or both) a certain type of data, requirements associated with user created passwords for a service, which settings should be turned on or turned off, whether a type of data should be encrypted, patterns associated with normal behavior, and/or whether multi-factor authentication should be enabled for a specified type of actors.

Violation detection engine 204 is configured to scan actual configurations and/or settings associated with an organization and compare them against the organization's internal reference information that is stored at reference information storage 202. In various embodiments, violation detection engine 204 is configured to scan the organization's actual configurations and/or settings that are stored at one or more data source servers and compare them to the organization's prescribed configurations/settings in the internal reference information. In some embodiments, violation detection engine 204 is configured to scan a data source server by performing an audit on a policy, as described above. In some embodiments, violation detection engine 204 is configured to perform free-form analyses on the organization's data and/or configurations at a data source server. Violation detection engine 204 is configured to determine each discrepancy between an actual configuration/setting and a corresponding prescribed configuration/setting as a detected violation. In some embodiments, violation detection engine 204 is configured to detect configuration related violations associated with an organization based on messages broadcasted or queried from third-party servers. For example, each violation may represent a security lapse, a misconfiguration, and/or a trigger to update the internal reference information.

Violation information storage 206 is configured to store information related to each violation that has been detected by violation detection engine 204. In some embodiments, information related to each violation includes a description of the violation including the relevant configuration/setting, actor, data source server, and/or a timestamp of occurrence or detection. In some embodiments, information related to each violation includes the current remediation status of the violation such as whether remediation has been started or completed for the violation. In some embodiments, information related to each violation includes an audit log. In various embodiments, an audit log is generated for a violation after the violation has been detected and is updated as new events associated with remediating the violation are performed (e.g., by the remediation server and/or a security administrator). In some embodiments, the audit log corresponding to a violation can be persisted (e.g., for a configurable period of time) even after the violation has been successfully remediated to maintain an explanation of how the violation became resolved.

In various embodiments, remediation engine 208 is configured to assign a severity corresponding to each violation. As mentioned above, the severity assigned to a violation is a value that is representative of the urgency/priority with which the violation is to be remediated. In some embodiments, prior to assigning a severity to a violation, remediation engine 208 first checks whether the violation is now moot (e.g., already resolved). For example, if the account of the actor that had caused the violation has been deactivated, then the violation is considered resolved and therefore moot, because the actor can no longer cause further harm from that account. For example, the severity corresponding to each violation is determined by remediation engine 208 as a function of one or more of the following: a role or a level of access of an actor associated with the violation, a degree of activity associated with the actor associated with the violation, whether any restrictions on access (e.g., whether multi-factor authentication) have been set for the actor associated with the violation, a tag (e.g., associated with a level of sensitivity or confidentiality) is related to data associated with the violation, and whether any compliance standards are related to the violation. In some embodiments, remediation engine 208 is configured to rank violations associated with an organization based on their respective severities. In some embodiments, remediation engine 208 is configured to send the severity-based rankings of the violations associated with the organization to output engine 212 so that output engine 212 can output a presentation of the violations according to those rankings at a user interface (e.g., that is presented at a client device associated with a security administrator).

Remediation engine 208 is configured to perform remediation to address the detected violations. In various embodiments, remediation engine 208 is configured to determine whether to remediate a violation using automatic remediation or manual remediation. In a first example, remediation engine 208 is configured to determine to perform automatic remediation on a violation based on the violation's corresponding severity. In a second example, remediation engine 208 is configured to determine to perform automatic remediation on a violation based on a relevant API being available to be programmatically used to change configurations/settings at a relevant data source server. To perform an automatic remediation, in some embodiments, remediation engine 208 is configured to translate the violation into a set of one or more API commands and to send the API commands (serially or at least partially concurrently) to a data source server to effect a change in configurations/settings for the organization associated with the violation. For example, the API commands are configured to cause changes in configurations/settings at the data source server to match the prescribed configurations/settings that are described in the organization's internal reference information. For violations that remediation engine 208 does not determine to perform automatic remediation, remediation engine 208 is configured to determine manual remediation for those violations. To perform a manual remediation, in some embodiments, remediation engine 208 is configured to obtain an instructions template corresponding to a violation type associated with a given violation and customize the template based on the violation instance specific parameters/values (e.g., information associated with the relevant actor, information associated with the relevant data source server, information associated with the configurations/settings, and the prescribed configuration/settings that should be used). Remediation engine 208 is configured to present the customized instructions template at a user interface that is presented at a client device associated with a security administrator associated with the organization. For a violation for which manual remediation is determined to be performed, in some embodiments, remediation engine 208 is configured to receive a user input commitment for completing the remediation steps that are described by the presented customized template. In some embodiments, the user input commitment is input via the user interface and includes identifying information associated with the security administrator that has made the commitment and also a deadline by which to complete the remediation steps. Remediation engine 208 is configured to periodically (e.g., at configured intervals or in response to a user instruction) detect violations and if remediation engine 208 determines that a violation for which a user had made a commitment to manually remediate by a deadline is still detected after that deadline, remediation engine 208 is configured to send a reminder to that user to perform the manual remediation. In some embodiments, for violations for which automatic remediation is not able to successfully resolve, remediation engine 208 is configured to perform manual remediation for those violations as described above.

Audit log engine 210 is configured to maintain an updated audit log corresponding to each violation that had been detected by remediation engine 208. Audit log engine 210 is configured to create a new audit log in violation information storage 206 for each new violation that is detected by remediation engine 208 and also update the new audit log with information regarding the new violation such as, for example, information associated with the relevant actor, information associated with the relevant data source server, information associated with the configurations/settings, and the timestamp associated with the detection. As remediation engine 208 performs events associated with either automatic or manual remediation for a violation, audit log engine 210 is configured to record each such event in the audit log of the violation along with a timestamp. For example, a remediation event that is recorded in the audit log of a violation can be sending an API command to a data source server to cause a specified configuration update at the data source server. In another example, a remediation event that is recorded in the audit log of the violation can be that the specified configuration update at the data source server has been successfully completed and that the violation has been resolved. In some embodiments, even after a violation has been resolved, audit log engine 210 is configured to maintain the resolved violation's audit log in violation information storage 206 so that the log can be viewed to inform a viewing user what the violation was and how it was resolved.

Output engine 212 is configured to output information related to each violation detected by remediation engine 208. In some embodiments, output engine 212 is configured to present, at a user interface displayed at a client device for a security administrator associated with an organization, information associated with the violations that have been detected for that organization. The presented information associated with the violations may have been stored at violation information storage 206. Output engine 212 is configured to present for each violation, for example, a description of the violation, a current remediation status, and at least some of the events recorded in the violation's audit log. In some embodiments, output engine 212 is configured to present information associated with the violations in a sequence/ranking that is determined based on the violations' severities that have been determined by remediation engine 208.

Figure 3:
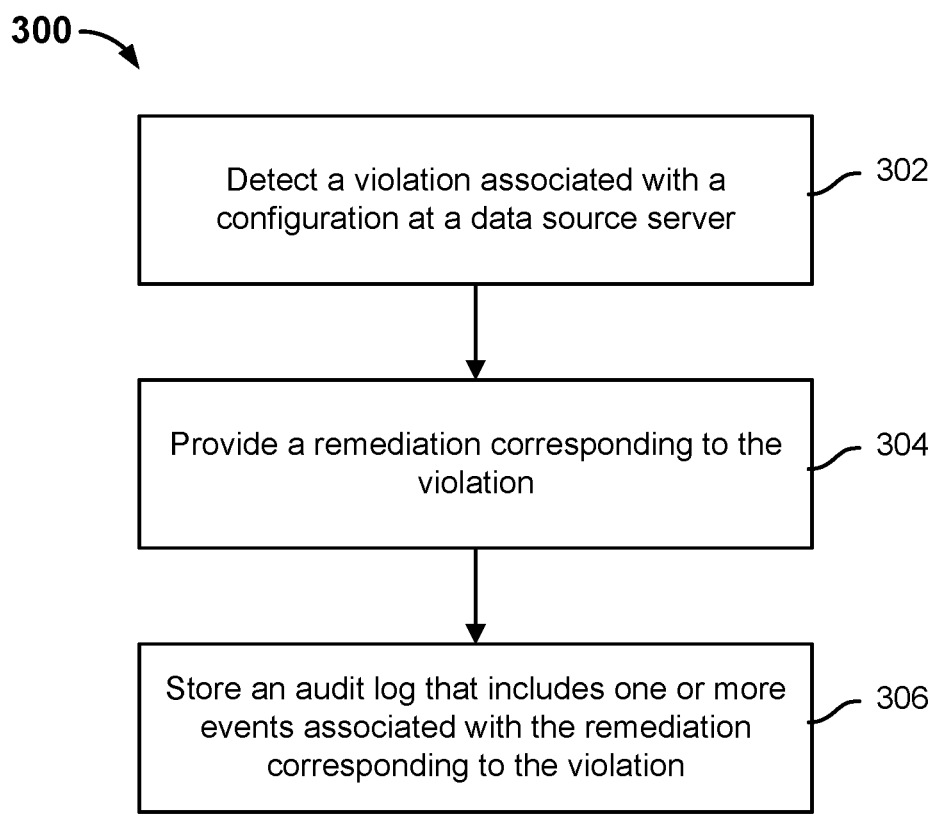
FIG. 3 is a flow diagram showing an embodiment of a process for remediating detected configuration related violations.

FIG. 3 is a flow diagram showing an embodiment of a process for remediating detected configuration related violations. In some embodiments, process 300 is implemented by remediation server 108 of system 100 of FIG. 1.

At 302, a violation associated with a configuration at a data source server is detected. A violation is detected at a data source server for a given organization based on a detected discrepancy between the organization's actual configuration/setting at the data source server and a prescribed configuration/setting that is described by internal reference information associated with the organization. For example, the data source server is configured to provide a (e.g., SaaS) service to the organization. For example, the organization's configurations at the data source server describe which type of data belonging to the organization is stored at the data source server and/or which types of actors can access which type of data. The discrepancy may be due to an intentional configuration, an unintentional configuration, or a result of an unauthorized interference (e.g., hacking). In some embodiments, the detection of violations may be initiated at a predetermined schedule, opportunistically, or in response to a user instruction.

At 304, a remediation corresponding to the violation is provided. A remediation corresponding to the violation includes steps to take to resolve the violation. For example, remediating a violation involves changing the actual configurations/settings at the data source server to match the prescribed configuration/setting that is described by internal reference information associated with the organization such that the violation will not be detected by a subsequent comparison between the actual configurations/settings to the prescribed configurations/settings. In some embodiments, the remediation is provided as an automatic remediation that is to be performed programmatically by sending API command(s) to the data source server. In some embodiments, the remediation is provided as a manual remediation by presenting a customized instructions template plan that describes how to manually update configurations associated with the data source server.

At 306, an audit log that includes one or more events associated with the remediation corresponding to the violation is stored. An audit log corresponding to the violation is maintained to record each event associated with the detection and also the remediation of the violation. In some embodiments, each event is recorded with a corresponding timestamp and identifying information associated with a user, if one is involved in that step. As such, the audit log is maintained to track the series of events that occur throughout the lifecycle of the violation (e.g., from the violation's detection to the last event in the provided remediation process that resolved the violation).

Figure 4:
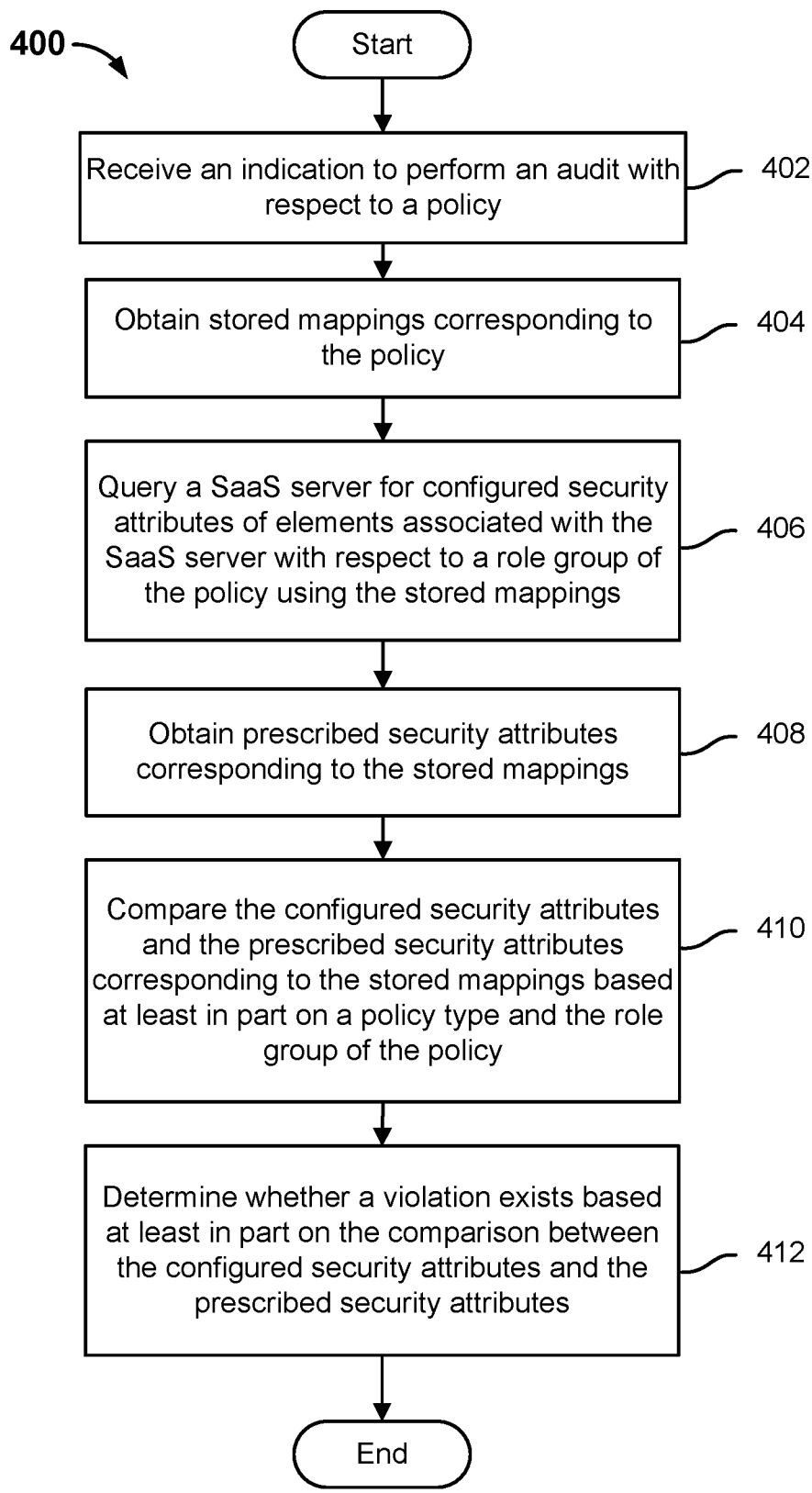
FIG. 4 is a flow diagram showing a first example of a process for detecting violations involving performing an audit of a policy.
Figure 5:
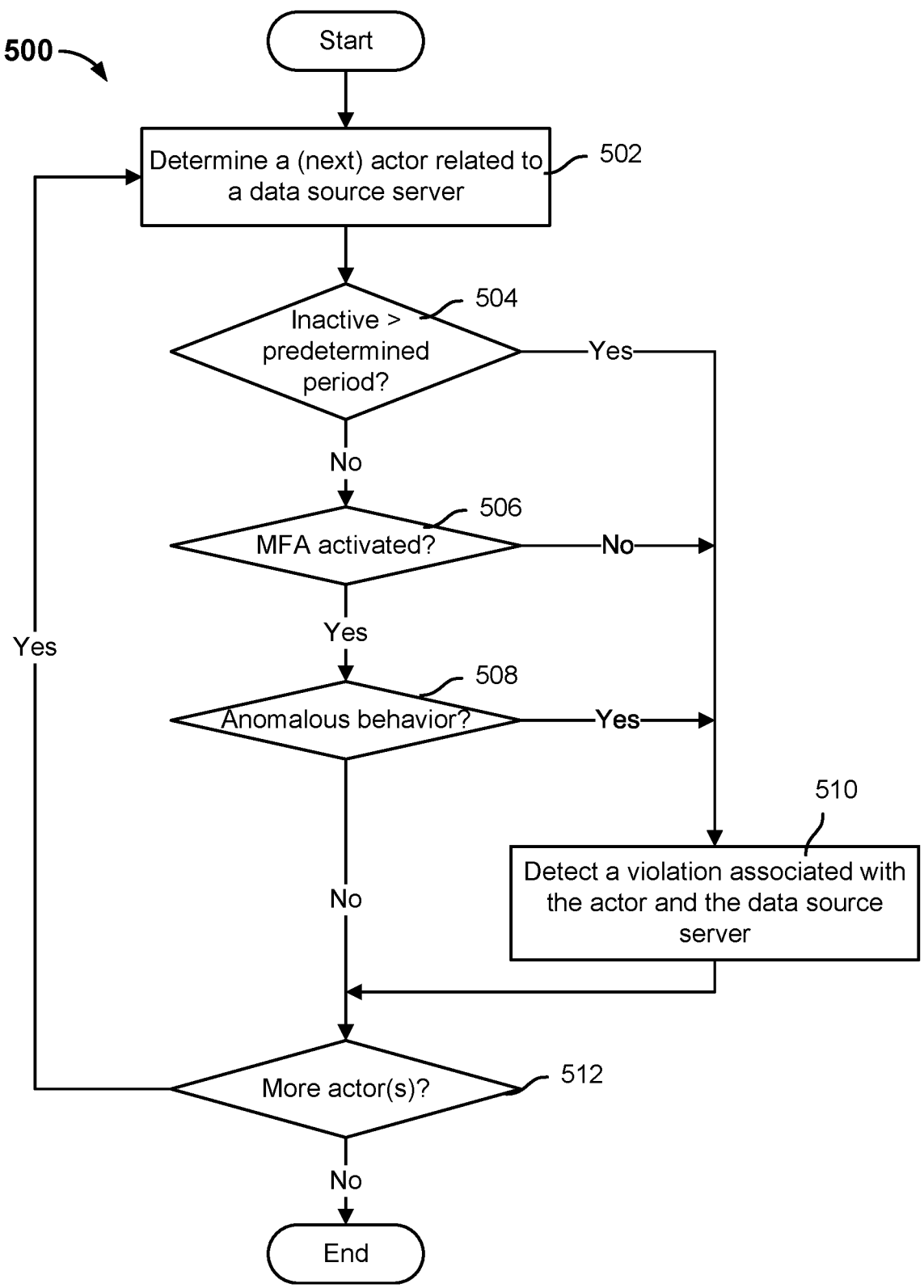
FIG. 5 is a flow diagram showing a second example of a process for detecting violations involving performing free-form analyses at a data source server.
Figure 6:
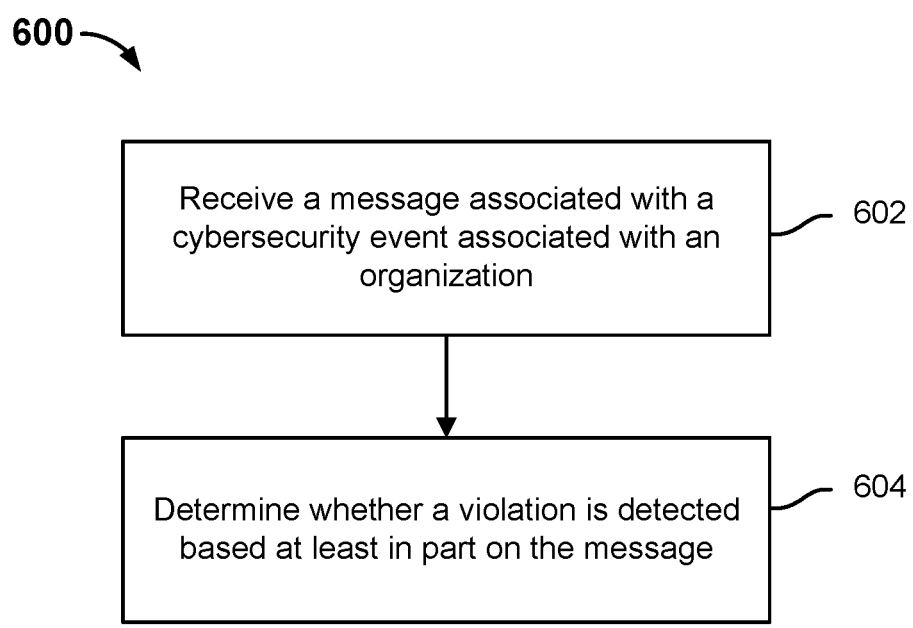
FIG. 6 is a flow diagram showing a third example of a process for detecting violations based on messages associated with cybersecurity events.

FIGS. 4, 5, and 6 each show different example techniques of detecting a violation at a data source server.

FIG. 4 is a flow diagram showing a first example of a process for detecting violations involving performing an audit of a policy. In some embodiments, process 400 is implemented by remediation server 108 of system 100 of FIG. 1.

Process 400 describes a process for detecting violations through performing an audit on a policy associated with a given organization.

At 402, an indication to perform an audit with respect to a policy is received. In some embodiments, a policy is defined by a user associated with the organization. In some embodiments, a policy includes, at least, a policy type (e.g., a whitelist policy, a blacklist policy, or a functional policy) and a specified role group with respect to a particular SaaS platform. A policy is one example type of internal reference information that can be stored for and/or configured by the given organization.

At 404, stored mappings corresponding to the policy are obtained. In some embodiments, the policy itself may include mappings that point to "elements" stored at the specified SaaS server associated with the SaaS platform. In various embodiments, an "element" comprises stored data, processed data, detected data, identified data, configuration, compliance or auditing-supporting elements, and user or administrative log events. In some embodiments, the policy itself does not include mappings but the policy specifies one or more classifications from a set of "classifications," and where each classification includes one or more mappings to elements stored at a specified SaaS server. For example, a set of classifications can represent the totality or portions of a business process, business structure, organizational structure, geographical structure, an industry standard, functional or security recommendations, or a data labeling scheme.

Each mapping includes a set of prescribed security attributes. In various embodiments, a "prescribed security attribute" is a security attribute that is a user submitted attribute that is to be associated with each element at the specified SaaS server that has been selected to be mapped to in the mapping. Examples of a "prescribed security attribute" include a privilege type, permission type, an access type, setting value, business process, user or admin event type, application integration, "cloud code" software file, channel access, repository access, or another component of a SaaS service. Specific examples of a prescribed security attribute include one or more of the following: create, read, edit, delete, share, list, upload, download, connect, login attempt, data access attempt, data modification attempt, API call, integration linkage, monitoring process, business process, administrative permission usage, view all, and modify.

At 406, a SaaS server is queried for configured security attributes of elements associated with the SaaS server with respect to a role group of the policy using the stored mappings. In various embodiments, a "configured security attribute" is a security attribute that had actually been configured at a particular data source (e.g., the specified SaaS server) associated with the element that is stored at, processed by, or made available through the data source. In various embodiments, the "role group" that is specified by the policy describes a set of actors with respect to the organization's elements that are stored at the SaaS server. In various embodiments, an "actor" comprises a user, a system, a machine, an image, a process, an application, an account, or a combination of one or more of the above.

At 408, prescribed security attributes corresponding to the stored mappings are obtained.

At 410, the configured security attributes and the prescribed security attributes corresponding to the stored mappings are compared based at least in part on a policy type and the role group of the policy. The policy type (e.g., whitelist or blacklist) will determine whether a discrepancy exists between the configured security attributes and the prescribed security attributes if the two sets of security attributes match each other or do not match each other.

At 412, whether a violation exists is determined based at least in part on the comparison between the configured security attributes and the prescribed security attributes. The existence of a discrepancy indicates that an intended/desired security attribute is not actually configured at the SaaS platform, which means that a violation is detected at the SaaS platform. The violation may be associated with sensitive elements being exposed (e.g., accessible), misconfigured, unmonitored, or related to actors that should not be able to access such data; data that should be exposed to certain users but those users do not have the desired access to such data; configurations that are not in compliance with recommendations or benchmarks; and/or actual events observed in a system.

In the specific example, a policy of the whitelist type of policy includes a role group that describes executives at Enterprise Acme and a selected classification that pertains to "Financials." The mappings that are stored for the "Financials" classification map to files, stored by Customer Relationship Management SaaS Platform Beta, that include details of Enterprise Acme's revenue from the last fiscal year. To perform an audit on the policy, the remediation server is configured to query the data source server corresponding to the Customer Relationship Management SaaS Platform Beta's server for the actually configured security attributes (e.g., access types such as a permission to read and/or a permission to edit) of executives at Enterprise A with respect to the files that map to the "Financials" classification. The mappings that are stored for the "Financials" classification also include the prescribed (e.g., intended/desired) security attributes corresponding to the Customer Relationship Management SaaS Platform Beta files. The configured security attributes of the Enterprise A executives with respect to the Customer Relationship Management SaaS Platform Beta files that map to the "Financials" classification are compared to the prescribed (e.g., intended/desired) security attributes that are included in the Customer Relationship Management SaaS Platform Beta mappings of the "Financials" classification. Because the policy is a whitelist policy, which describes allowed accesses, the configured security attributes are intended to match the prescribed (e.g., intended/desired) security attributes. In this example, if the configured security attributes did match the prescribed security attributes, then the Enterprise A executives have the desired types of access (e.g., the ability to read and edit) to the files at Customer Relationship Management SaaS Platform Beta. However, if the configured security attributes did not (e.g., exactly) match the prescribed security attributes, then at least one discrepancy exists. Specifically, the existence of at least a discrepancy in this example means that at least some of the Enterprise A executives lack the desired types of access (e.g., the ability to read and edit) to the files at Customer Relationship Management SaaS Platform Beta. Information related to this discrepancy, which may be indicative of a security risk, is presented at the user interface.

FIG. 5 is a flow diagram showing a second example of a process for detecting violations involving performing free-form analyses at a data source server. In some embodiments, process 500 is implemented by remediation server 108 of system 100 of FIG. 1.

Process 500 describes a process for detecting violations associated with a given organization through free-form analyses at a data source server. Process 500 describes a few example types of free-form analyses and other types of free-form analyses can be performed at a data source server to detect configuration related violations.

At 502, a (next) actor related to a data source server is determined. For example, the actor can be a user associated with the organization. For example, the data source server may provide a SaaS platform that provides a SaaS service to the organization. Specifically, the user can be an employee, a contractor, or a customer of the organization that has an account at the SaaS service or is otherwise able to access the service.

At 504, whether the actor has been inactive over a predetermined period of time is determined. In the event that the actor has been inactive over a predetermined period of time, control is transferred to 510. Otherwise, in the event that the actor has not been inactive over a predetermined period of time, control is transferred to 506. For example, the organization's internal reference information may prescribe a predetermined period of time (e.g., 90 days) such that if the actor's account with the particular SaaS service provided by the SaaS server is inactive (e.g., the user does not log into the account) for a period that is greater than the predetermined period of time, then the actor's prolonged inactivity is determined as a violation.

At 506, whether multi-factor authentication (MFA) has been activated for the actor is determined. In the event that multi-factor authentication has been activated for the actor, control is transferred to 508. Otherwise, in the event that multi-factor authentication has not been activated for the actor, control is transferred to 510. For example, the organization's internal reference information may prescribe that all users of the particular SaaS service that is provided by the SaaS server must have MFA turned on such that if the actor's account does not have MFA turned on, then the actor's authentication configuration is determined as a violation.

At 508, whether behavior performed by the actor is anomalous is determined. In the event that behavior performed by the actor is anomalous is determined, control is transferred to 510. Otherwise, in the event that behavior performed by the actor is not anomalous is determined, control is transferred to 512. For example, the organization's internal reference information may prescribe what is considered to be normal behavior patterns (e.g., the frequencies of access, the times of day of access, the types of files that are accessed, and the read and/or write access types) for the specific actor or a set of actors associated with the particular SaaS service provided by the SaaS server. Therefore, if the recent (e.g., as observed over a recent predetermined window of time) behavior at the particular SaaS service provided by the SaaS server that is monitored for the actor does not correspond (e.g., beyond a given tolerance) with what is prescribed as the normal behavior pattern, then the actor's behavior is considered anomalous and also determined as a violation.

At 510, a violation associated with the actor and the data source server is detected. In various embodiments, information related to the violation (e.g., including the identifying information of the actor and the particular SaaS service provided by the data source server) is added to the newly generated audit log for the violation.

At 512, whether there is at least one more actor related to the data source server is determined. In the event that there is at least one more actor related to the data source server, control is returned to 502. Otherwise, in the event that there are no more actors related to the data source server, process 500 ends.

FIG. 6 is a flow diagram showing a third example of a process for detecting violations based on messages associated with cybersecurity events. In some embodiments, process 600 is implemented by remediation server 108 of system 100 of FIG. 1.

Process 600 describes a process for detecting violations associated with a given organization based on messages associated with cybersecurity events received from third-party servers.

At 602, a message associated with a cybersecurity event associated with an organization is received. Examples of cybersecurity events include a data leak, a hacking event, a ransomware event, and/or a privacy rating.

At 604, whether a violation is detected is determined based at least in part on the message. For example, the message can be compared against a given organization's internal reference information to determine whether the event described in the message is a violation or not.

Figure 7:
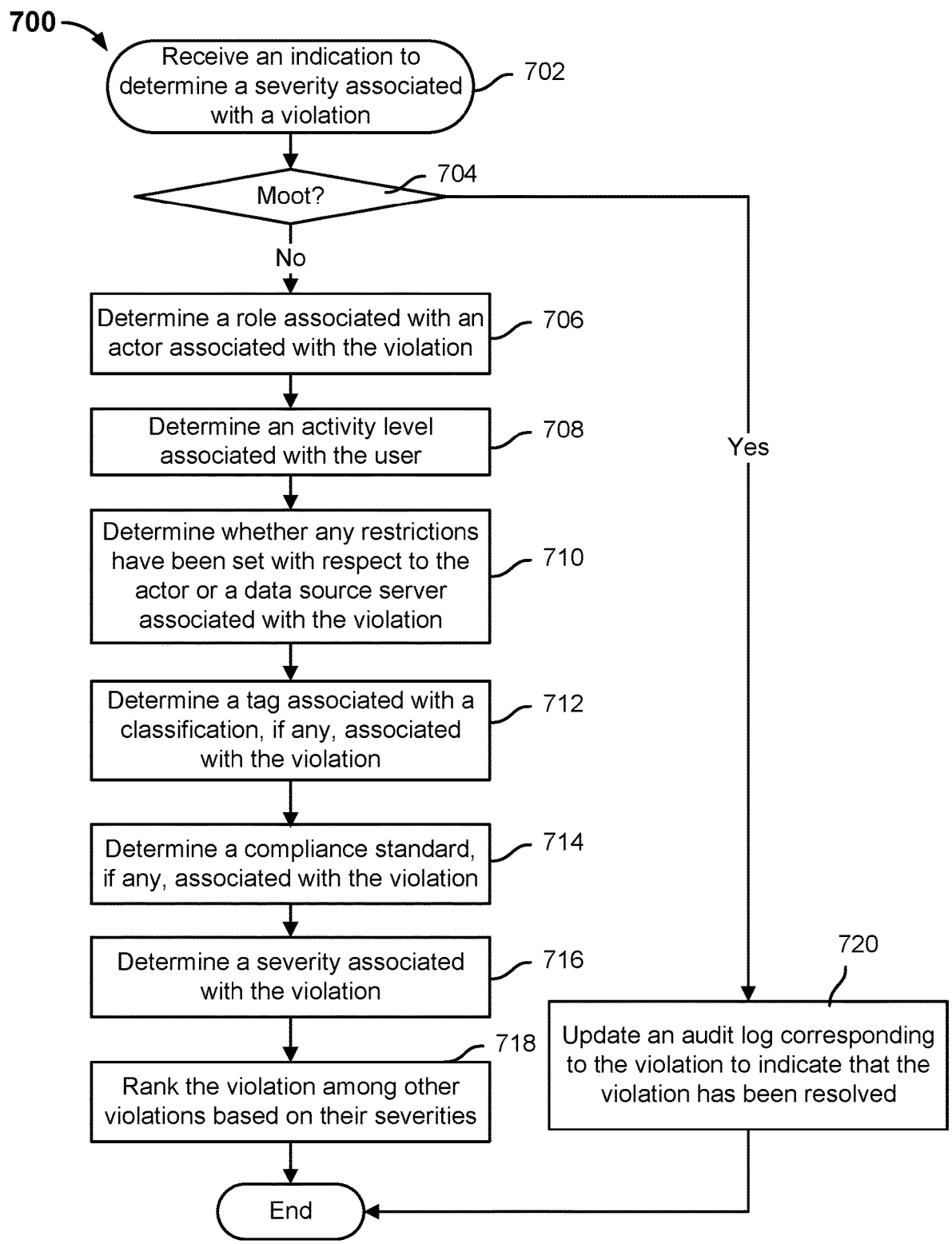
FIG. 7 is a flow diagram showing an example process for determining a severity associated with a violation.

FIG. 7 is a flow diagram showing an example process for determining a severity associated with a violation. In some embodiments, process 700 is implemented by remediation server 108 of system 100 of FIG. 1.

Process 700 describes a process for assigning a severity to a violation. Process 700 describes a few example factors that can be used to assign a severity to a violation but in actual practice, other types of factors can also be used to determine the severity of a violation.

At 702, an indication to determine a severity associated with a violation is received. For example, an indication to determine a severity is received for a newly detected violation. The violation includes, at least, an associated actor (e.g., a user or a group of users) and also a data source server at which the offending configuration was determined.

At 704, whether the violation has been rendered moot is determined. In the event that the violation has been rendered moot, control is transferred to 720. Otherwise, in the event that the violation has not been rendered moot, control is transferred to 706. Before a severity is determined for a violation, it is first checked whether the violation is still ongoing (i.e., not yet resolved) because an intervening event since the detection of the violation could have occurred that would have resolved the violation (i.e., rendered the violation moot). A violation that has been rendered moot (before a corresponding severity could be determined for it) no longer needs to be remediated by the remediation server. A first example of determining that the violation is moot is if the account of the actor that is determined to have caused the violation is deactivated. A second example of determining that the violation is moot is if the prescribed configuration that is described in the relevant organization's internal reference information is updated such there is no longer a discrepancy (e.g., within a given tolerance) between the actual configuration and the updated prescribed configuration.

At 720, an audit log corresponding to the violation is updated to indicate that the violation has been resolved. Even though the detected violation has been rendered moot, its corresponding audit log is updated with a new event to indicate that it has been rendered moot. The event indicating that the violation has been rendered moot can also describe the reason/intervening event that had caused the violation to be rendered moot.

At 706, a role associated with an actor associated with the violation is determined. The role and corresponding level of access that is associated with the violation is determined. For example, a role that is associated with a greater level of access (e.g., an administrator role) will increase the severity of the violation and a role that is associated with a lower level of access (e.g., a non-administrator role) will decrease the severity of the violation because the greater level of access could lead to a greater security risk.

At 708, an activity level associated with the user is determined. For example, a higher activity level (e.g., as determined based on the number and/or frequency of times that the actor had logged onto the data source server) will increase the severity of the violation and a lower activity level will decrease the severity of the violation because the greater activity level could lead to a greater security risk.

At 710, whether any restrictions have been set with respect to the actor or a data source server associated with the violation is determined. Restrictions on the actor or with respect to the data source server will decrease the severity of the violation because the restrictions could limit the access that the actor has to the data source server and therefore reduce the security risk of the violation. Examples of restrictions include multi-factor authentication and temporal/geographic restrictions on how the actor can access the data source server.

At 712, a tag associated with a classification, if any, associated with the violation is determined. A tag that indicates a sensitive/confidential nature of a classification that is associated with the relevant configuration that is associated with the violation can be used as a factor in determining the severity of the violation. For example, a tag that indicates a sensitive/confidential nature of the classification will increase the severity of the violation and a tag that indicates a lack of sensitive/confidential nature of the classification will decrease the severity of the violation because the exposure of sensitive/confidential data could lead to a greater security risk.

At 714, a compliance standard, if any, associated with the violation is determined. Whether any compliance standard (e.g., legal standards) were associated with the violation is determined. Examples of compliance standards include payment card industry (PCI) compliance and Sarbanes-Oxley. If the violation were associated with a compliance standard, then the severity of the violation will increase because of the violation's greater associated legal risk.

At 716, a severity associated with the violation is determined. The severity is a value that is determined based on factors such as those determined and described above in steps 706 through 712. For example, the larger the value of the determined severity for the violation, the more urgently the violation should be remediated.

At 718, the violation is ranked among other violations based on their severities. The violation is ranked among other violations based on their respective severities. For example, a violation with a greater severity is ranked higher than a violation with a lower severity.

Figure 8:
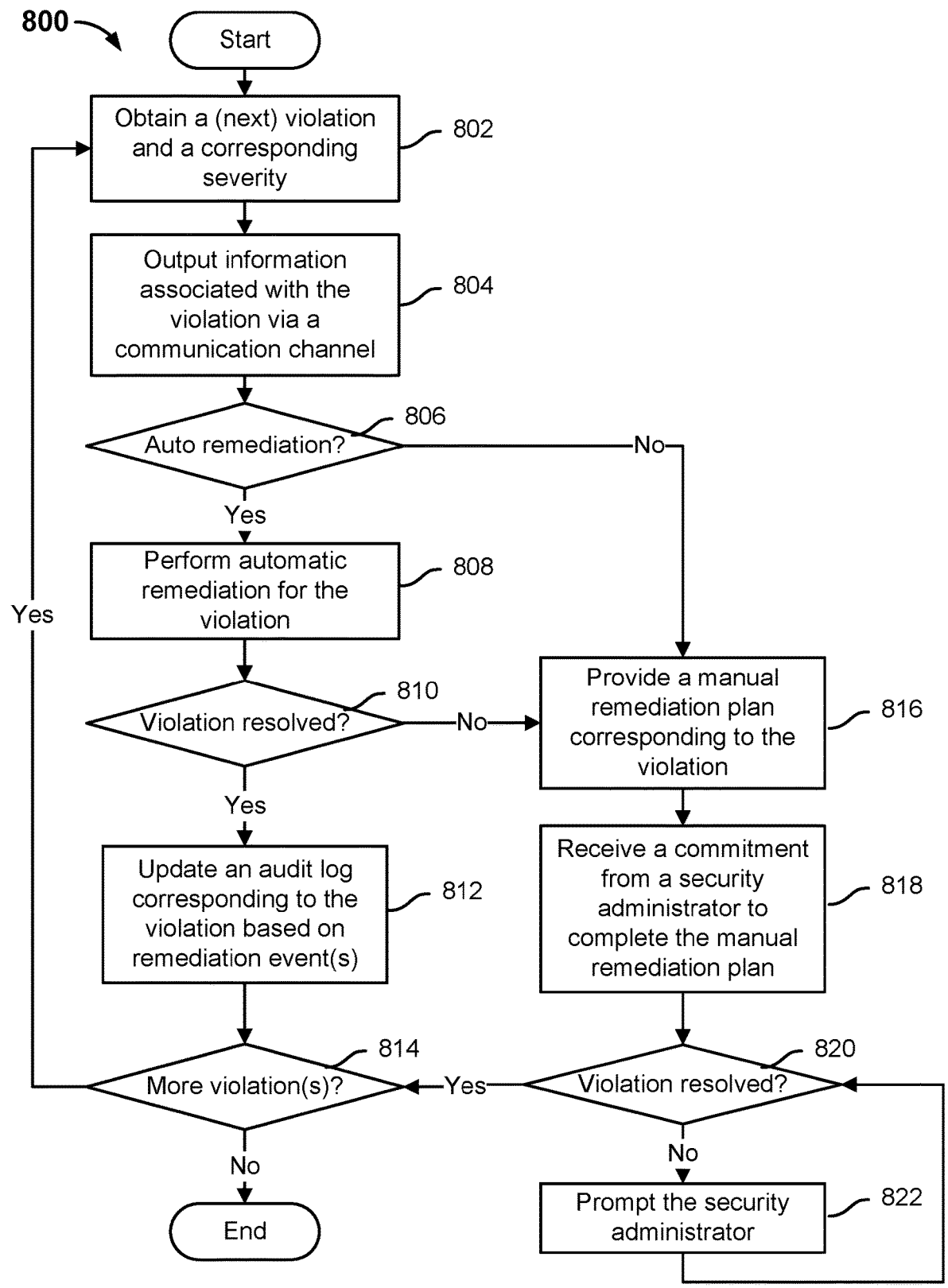
FIG. 8 is a flow diagram showing an example process for performing automatic remediation and/or manual remediation for a violation.

FIG. 8 is a flow diagram showing an example process for performing automatic remediation and/or manual remediation for a violation. In some embodiments, process 800 is implemented by remediation server 108 of system 100 of FIG. 1.

Process 800 describes an example process for remediating a violation by first determining whether to remediate the violation using automatic remediation or manual remediation. Process 800 also shows that a violation for which automatic remediation does not (completely) resolve, manual remediation can be performed to the same violation. While process 800 shows that violations can be sequentially remediated, in practice, multiple violations can be at least partially, concurrently remediated.

At 802, a (next) violation and a corresponding severity are obtained. In some embodiments, the severity of the violation was determined using a process such as process 700 of FIG. 7.

At 804, information associated with the violation is output via a communication channel. In some embodiments, information associated with the violation is sent to a security administrator via a communication channel such as, for example, a user interface that is presented by an application, a messaging platform, an email application, and/or a portal associated with a workflow management application. Examples of information associated with the violation that could be output include the violation type, the relevant data source server, the relevant organization, the relevant actor, the current remediation status, and/or the audit log associated with the violation.

At 806, whether automatic remediation is to be performed for the violation is determined. In the event that automatic remediation is to be performed for the violation, control is transferred to 808. Otherwise, in the event that manual rather than automatic remediation is to be performed for the violation, control is transferred to 816. In some embodiments, whether automatic remediation is to be performed for the violation is determined based on whether an API that can be programmatically used to send commands to the data source server at which the offending configurations associated with the violation were detected is available. If such an API is available, then automatic remediation is determined to be performed for the violation. In some embodiments, whether automatic remediation is to be performed for the violation is determined based on the severity of the violation. For example, if the severity determined for the violation is greater than a severity threshold and/or has been bucketed into a group of violations with the highest severities, then automatic remediation is determined to be performed for the violation.

At 808, automatic remediation is performed for the violation. In some embodiments, performing an automatic remediation for the violation includes translating the violation into a series of one or more API commands and then sending the API commands to the data source server to cause updates in configurations at the data source server for the organization associated with the violation. An example process of performing automatic remediation is described in FIG. 9, below.

At 810, whether the violation has been resolved is determined. In the event that the violation has been resolved, control is transferred to 812. Otherwise, in the event that the violation has not been resolved, control is transferred to 816. In some embodiments, determining whether the violation has been resolved is based on whether all of the configuration changes to be updated by the data source server were successfully updated by the API command(s). If any of the configurations to be changed were not updated (e.g., due to a time out at the data source server and/or a message from the data source server indicating that the update was not made), manual remediation is to be performed for the violation to complete the remediation.

At 812, an audit log corresponding to the violation is updated based on remediation event(s) associated with the automatic remediation. One or more events that were performed by the automatic remediation (e.g., the sending of the API command(s)) are recorded in the audit log of the violation. Furthermore, an event indicating that the violation had been successfully remediated/resolved is also added to the audit log of the violation.

At 814, whether there is at least one more violation to be remediated is determined. In the event that there is at least one more violation to be remediated, control is returned to 802 to start remediation on another violation. Otherwise, in the event that there are no more violations to remediate, process 800 ends.

At 816, a manual remediation plan corresponding to the violation is provided. In some embodiments, providing the manual remediation plan comprises to obtain a template corresponding to the violation, update the template with the specific parameters of the violation, and then output the customized template at a user interface. An example process of performing manual remediation is described in FIG. 10, below.

At 818, a commitment from a security administrator to complete the manual remediation plan is received. In some embodiments, the commitment to complete the manual remediation plan is a user input from a security administrator indicating that the security administrator agrees to implement the steps described in the manual remediation plan. In some embodiments, the commitment also includes a user provided deadline by which he or she would complete all the steps described in the manual remediation. In some embodiments, the commitment is added to the audit log of the violation.

At 820, whether the violation has been resolved is determined. In the event that the violation has been resolved, control is transferred to 814. Otherwise, in the event that the violation has not been resolved, control is transferred to 822 to prompt the security administrator. In some embodiments, whether the violation has been resolved is determined by checking whether the violation is still detectable. In some embodiments, if the violation is no longer detectable, then the violation is determined to be resolved and the violation's corresponding audit log updated with the event that the violation has been resolved. In some embodiments, whether the violation has been resolved (i.e., whether the violation is still detectable) is determined after the user provided deadline in the commitment. In the event that the violation has not been resolved (e.g., by the user provided deadline in the commitment), a prompt (e.g., via email or another communication channel) is periodically sent to the security administrator associated with the commitment until the violation is determined to be resolved.

Figure 9:
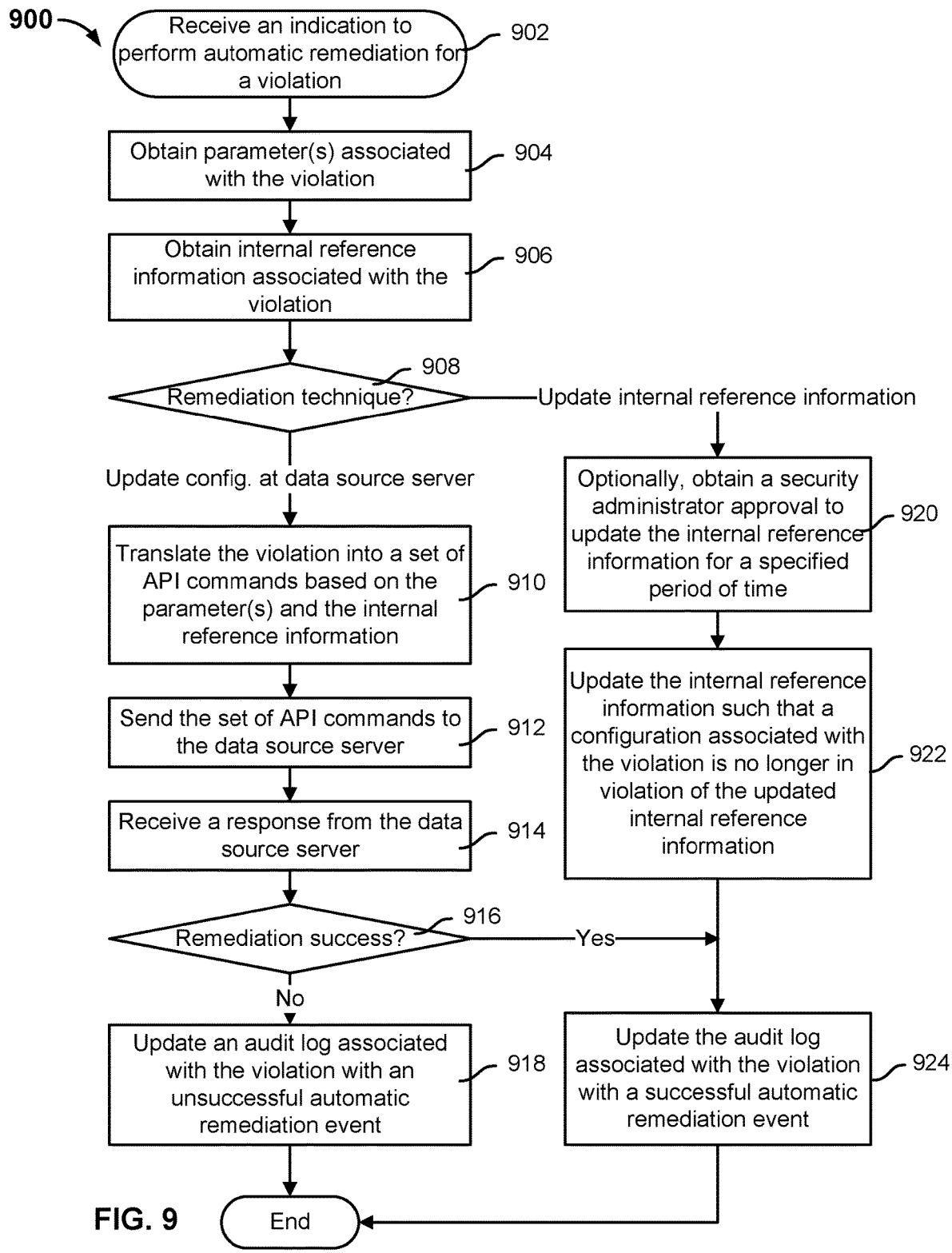
FIG. 9 is a flow diagram showing an example process for performing automatic remediation for a violation.

FIG. 9 is a flow diagram showing an example process for performing automatic remediation for a violation. In some embodiments, process 900 is implemented by remediation server 108 of system 100 of FIG. 1. In some embodiments, step 808 of process 800 of FIG. 8 is implemented using process 900.

At 902, an indication to perform automatic remediation for a violation is received.

At 904, parameters associated with the violation are obtained. Example parameters associated with the violation include the relevant actor, the relevant data source server at which the offending configuration was detected, the relevant organization, and the violation type.

At 906, internal reference information associated with the violation is obtained. The internal reference information associated with the relevant organization associated with the violation is obtained. The internal reference information includes the prescribed configurations that should be made for the organization at one or more data source servers or at a server associated with the organization.

At 908, a remediation technique type is determined. In the example of process 900, whether the remediation technique type to be used is determined to be updating the internal reference information or to be updating a configuration at a data source server is determined. In the event that updating the internal reference information is to be used, control is transferred to 920. Otherwise, in the event that updating the configuration at the data source server is to be used, control is transferred to 910. In some embodiments, whether the remediation technique type that should be used to automatically remediate the violation is to update the internal reference information or to update a configuration at a data source server is determined based on factors such as, for example, the violation type and whether it is possible to programmatically update a configuration at the data source server. For example, if it is not possible to update the configuration at the data source server because the data source server is currently down or no such API command is available to use to effect the update at the data source server, then the organization's internal reference information can be (e.g., temporarily) updated to accommodate the offending configuration associated with the violation.

At 910, the violation is translated into a set of API commands based on the parameters and the internal reference information. In some embodiments, the appropriate API command to use is first determined based on the relevant data source server associated with the violation. Once the appropriate API is determined, the internal reference information and the parameters of the violation are used to translate the violation into a set of API commands that can be used to remediate the violation. In a specific example, the set of API commands are configured to cause the offending actual configurations/settings associated with the relevant organization that are detected at the data source server to be updated to match the prescribed configurations/settings that are described in the internal reference information. In some embodiments, the set of API commands describes a sequence in which the API commands should be sent to the data source server.

Examples of configuration updates at the data source server that can be made via API commands include, but are not limited to, the following: creating computer code, deleting computer code, changing computer code, revoking credentials/tokens, changing the scope of access of one or more actors, changing the permissions associated with a role group, manipulating databases, enabling or disabling features, encrypting or decrypting data, blocking access for an actor, logging an actor out of his or her account, and/or uninstalling a software package or module.

A specific example of using API commands to update a configuration at a data source server is as follows: Acme Organization uses a productivity software service that is provided by Beta Company. While Acme's internal reference information prescribes that all Acme's users of Beta's productivity software service should use 12-character passwords, a violation is detected on the basis that the current password length requirement for Acme users for Beta's service is only 8 characters. As such, a set of commands using an API that is provided by Beta can be used to update the password character length requirement for Acme users from 8 characters to 12 characters.

At 912, the set of API commands is sent to the data source server.

At 914, a response from the data source server is received. One possible response from the data source server may indicate that the set of API commands has successfully updated the organization's configuration to match the configurations prescribed by the API command. A second possible response from the data source server may indicate that the API commands have not yet processed. A third possible response from the data source server may indicate that the API commands cannot be processed.

At 916, whether the automatic remediation is successful is determined. In the event that automatic remediation is successful is determined, control is transferred to 924. Otherwise, in the event that automatic remediation is not successful is determined, control is transferred to 918. In some embodiments, if the response from the data source server indicates that any fewer than all of the configurations to be updated were updated, then the automatic remediation is considered to be less than completely successful and only partially successful. However, if the response from the data source server indicates that all of the configurations to be updated were updated, then the automatic remediation is considered to be completely successful.

At 918, an audit log associated with the violation is updated with an unsuccessful automatic remediation event. The audit log is updated to indicate whether a partial set, if any, of the configurations to be updated was successfully updated using API commands and also those configuration(s) that were not successfully updated using API commands.

At 920, optionally, a security administrator approval to update the internal reference information for a specified period of time is obtained. In some embodiments, before the internal reference information of an organization can be updated, approval from a security administrator is first needed. For example, a prompt is sent to a security administrator associated with the organization to request permission to update the internal reference information (e.g., for a predetermined period of time or permanently) and only after permission is granted by the security administrator can the internal reference information be updated.

At 922, the internal reference information is updated such that a configuration associated with the violation in no longer in violation of the updated internal reference information. One or more prescribed configurations within the organization's internal reference information are programmatically updated to be values such that the detected configuration/event that had caused the violation to be detected is no longer considered a violation against the updated prescribed configurations.

A specific example of updating an organization's internal reference information is as follows: Acme Organization's internal reference information prescribes the use of a federated login service that is provided by Gamma Company in order to access certain applications. A violation is detected on the basis that a Gamma server has timed out in response to a request by an Acme employee to use the federated login service. As a result of the Gamma server being unavailable, Acme users cannot use the Gamma federated login service to log in to one or more applications that are needed to be accessed by the Acme users. As such, Acme Organization's internal reference information can be updated to not prescribe/require the use of a federated login service that is provided by Gamma Company in order to log in to the applications to accommodate Gamma's service outage such that violations would not be detected if, for example, an Acme user directly logged into an application that is normally accessible via Gamma's federated login service.

At 924, an audit log associated with the violation is updated with a successful automatic remediation event. The audit log is updated to indicate the configuration(s) that were successfully updated using API commands and that the violation is resolved.

Figure 10:
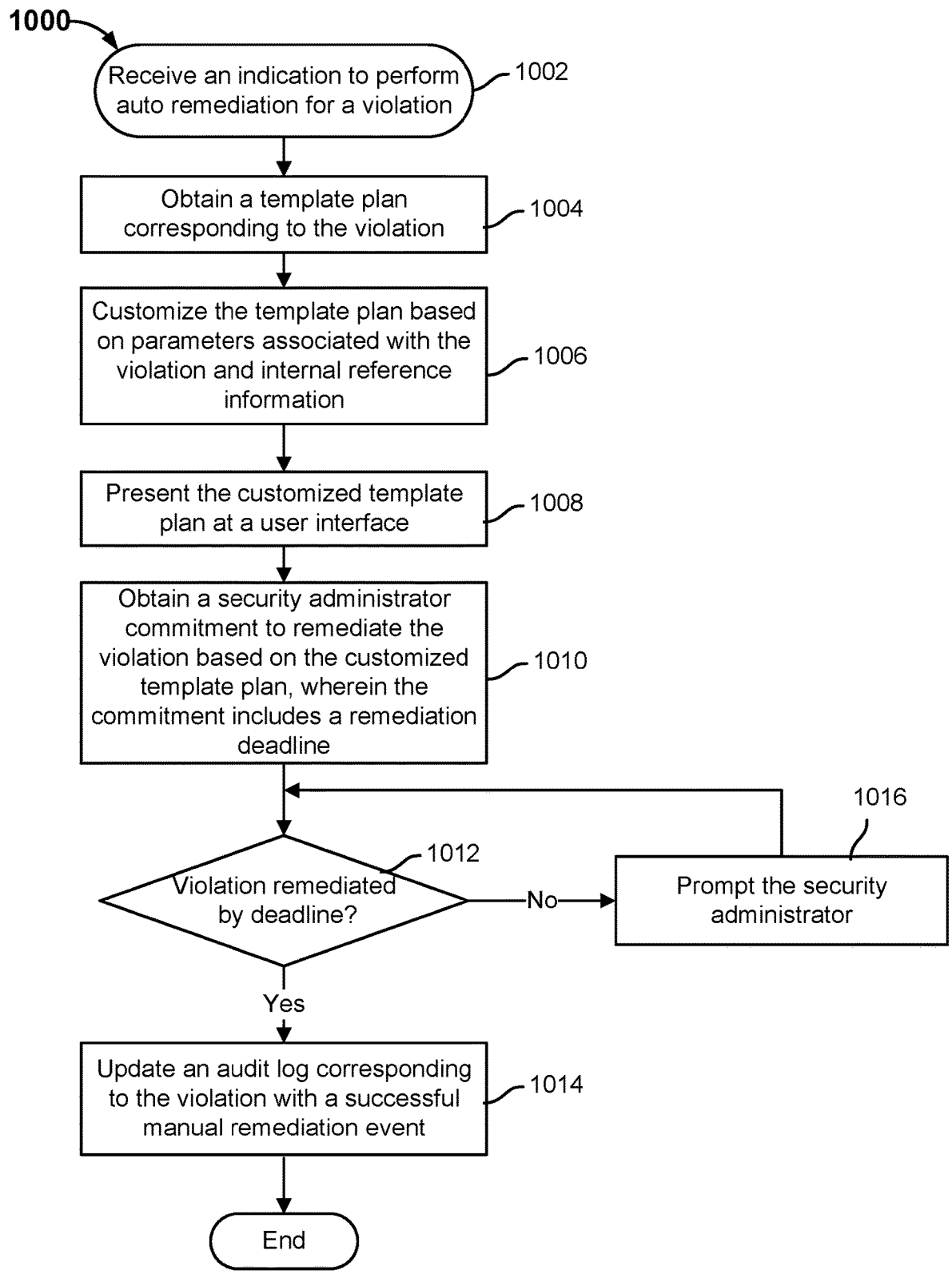
FIG. 10 is a flow diagram showing an example process for performing manual remediation for a violation.

FIG. 10 is a flow diagram showing an example process for performing manual remediation for a violation. In some embodiments, process 1000 is implemented by remediation server 108 of system 100 of FIG. 1. In some embodiments, step 816 of process 800 of FIG. 8 is implemented using process 1000.

At 1002, an indication to perform manual remediation for a violation is received.

At 1004, a template plan corresponding to the violation is obtained. In some embodiments, template plans corresponding to different types of violations are predetermined. A template plan that corresponds to the violation type associated with the violation is obtained from storage. The template plan includes step-by-step instructions on actions that need to be taken to update configurations to remediate the violation. The template plan includes placeholders or other variables to be updated with parameters associated with a given violation.

At 1006, the template plan is customized based on parameters associated with the violation and internal reference information. The placeholders or other variables in the template plan are updated with the parameters (e.g., the relevant actor and the relevant data source server at which the offending configuration was detected) that are associated with the violation and also the prescribed configurations that are described in the organization's internal reference information. For example, the customized template plan will instruct a security administrator how to update the organization's configurations that caused the violation to be detected to match the appropriate prescribed configurations to remediate the violation.

At 1008, the customized template plan is presented at a user interface.

At 1010, a security administrator commitment to remediate the violation based on the customized template plan is obtained, wherein the commitment includes a remediation deadline. The commitment comprises, at least, identifying information associated with the security administrator that had indicated that he or she is to be accountable to implement the manual remediation plan and a deadline by which to complete the remediation plan.

At 1012, whether the violation has been remediated by the remediation deadline is determined. In the event that the violation has been remediated by the remediation deadline, control is transferred to 1014. Otherwise, in the event that the violation has not been remediated by the remediation deadline, control is transferred to 1016. In some embodiments, if the violation is no longer detectable, then the violation is determined to be resolved and the violation's corresponding audit log updated with the event that the violation has been resolved. In some embodiments, whether the violation has been resolved (i.e., whether the violation is still detectable) is determined after the user provided deadline in the commitment.

At 1014, an audit log corresponding to the violation is updated with a successful manual remediation event. The audit log is updated to identify the security administrator that had committed to implement the manual remediation plan and that the plan had been completed by that user.

At 1016, the security administrator is prompted. In the event that the violation has not been resolved (e.g., by the user provided deadline in the commitment), a prompt (e.g., via email or another communication channel) is periodically sent to the security administrator associated with the commitment until the violation is determined to be resolved.

A specific example of providing a manual remediation plan is as follows: Acme Organization's internal reference information prescribes a pre-approved list of users that should be granted an administrative profile. A violation is detected on the basis that newly hired employee John Smith for Acme, who is not on the pre-approved list, is granted an administrative profile. A manual remediation plan provides instructions to update John Smith's profile to be a non-administrative profile or alternatively, update Acme's pre-approved list to add John Smith.

Figure 11:
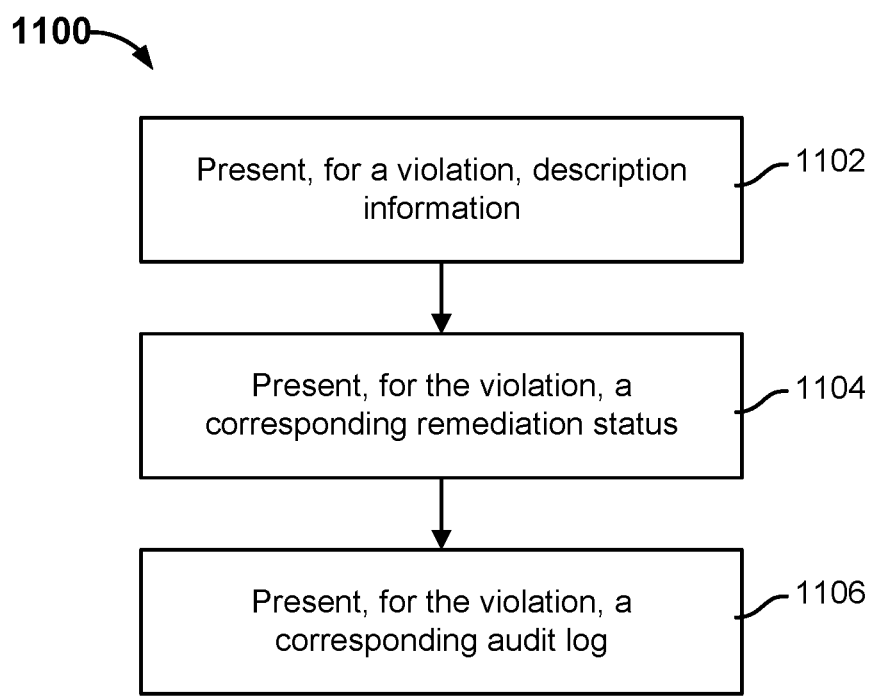
FIG. 11 is a flow diagram showing an example process for outputting information associated with a violation.

FIG. 11 is a flow diagram showing an example process for outputting information associated with a violation. In some embodiments, process 1100 is implemented by remediation server 108 of system 100 of FIG. 1.

Process 1100 describes an example process for presenting information for one violation. Process 1100 can be repeated for each of multiple violations for which information is presented at a single user interface.

At 1102, description information is presented for a violation. Description information may include, for example, the parameters associated with the violation. Example parameters associated with the violation include the relevant actor, the relevant data source server at which the offending configuration was detected, the relevant organization, and the violation type.

At 1104, a corresponding remediation status is presented for the violation. The remediation status for the violation may include whether a remediation for the violation has not yet started, is currently in progress, or has been completed.

At 1106, a corresponding audit log is presented for the violation. As described above, the audit log for the violation describes events related to the violation including the detection of the violation, whether any remediation events have been performed for the violation and by whom, and also timestamps associated with each event.

FIG. 12 is a diagram showing an example user interface for presenting information related to violations associated with an organization, Acme. For example, user interface 1200 can be presented at a client device that is used by a security administrator associated with the organization, Acme. In the example of FIG. 12, user interface 1200 presents three columns of information ("Detected Violations," "Remediation Status," and "Audit Log") for each detected violation. As shown in user interface 1200, Violation A is a violation where an actor has been performing anomalous activity ("User_123 has been downloading a large number of files from SaaS Service Delta"). Violation A has already been resolved (successfully remediated) and its audit log describes the event that resulted in the successful remediation ("2021-06-17 at 1:32 am: User_123 is temporarily denied access to SaaS Service Delta."). As shown in user interface 1200, Violation B is a violation where a discrepancy is detected between a prescribed security attribute of Policy X and a configured security attribute associated with Acme. The current remediation status for Violation B is that an automatic remediation is currently in progress. The audit log for Violation B indicates an event in which API commands were programmatically sent to the data source server ("SaaS Service Epsilon") at which the security attribute was configured. As shown in user interface 1200, Violation C is a violation where an outage is detected at Acme's payroll software service. The current remediation status for Violation C is that a manual remediation is currently in progress. The audit log for Violation C indicates a first event in which a manual remediation plan is sent to a security administrator user and a second event in which a commitment to implement the manual remediation plan was received from the security administrator user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      detect a violation associated with a configuration at a data source server, wherein to detect the violation associated with the configuration at the data source server comprises to:
         receive an indication to perform an audit with respect to a policy;
         obtain stored mappings corresponding to the policy:
         query the data source server for configured security attributes of elements associated with the data source server with respect to a role group of the policy using the stored mappings:
         obtain prescribed security attributes corresponding to the stored mappings:
         compare the configured security attributes and the prescribed security attributes corresponding to the stored mappings based at least in part on a policy type and the role group of the policy;
         determine that the violation exists based at least in part on the comparison between the configured security attributes and the prescribed security attributes;
      provide a remediation corresponding to the violation; and
      store an audit log that includes one or more events associated with the remediation corresponding to the violation; and
   a memory coupled to the processor and configured to provide the processor with instructions.

2. The system of claim 1, wherein the violation comprises a first violation, wherein the configuration comprises a first configuration, and wherein the processor is further configured to detect a second violation associated with a second configuration at the data source server comprises to determine whether an actor related to the data source server is one or more of the following: has been inactive on the data source server for more than a predetermined period, does not have multi-factor authentication enabled, and has performed anomalous behavior.

3. The system of claim 1, wherein the violation comprises a first violation, wherein the configuration comprises a first configuration, and wherein the processor is further configured to detect a second violation associated with a second configuration at the data source server comprises to:
   receive a message associated with a cybersecurity event; and
   determine the second violation has occurred based at least in part on the message.

4. The system of claim 1, wherein the processor is further configured to:
- determine whether the violation has been rendered moot; and
- in response to the determination that the violation has been rendered moot, omit determining a severity corresponding to the violation.

5. The system of claim 1, wherein the processor is further configured to:
- determine a severity corresponding to the violation; and
- rank the violation among other violations based on their respective severities.

6. The system of claim 5, wherein providing the remediation corresponding to the violation is based at least in part on the severity corresponding to the violation.

7. The system of claim 1, wherein to provide the remediation corresponding to the violation comprises to provide an automatic remediation including to:
- obtain parameters associated with the violation;
- obtain internal reference information associated with the violation;
- translate the violation into a set of application programming interface (API) commands based on the parameters and the internal reference information; and
- send the set of API commands to the data source server.

8. The system of claim 1, wherein to provide the remediation corresponding to the violation comprises to provide an automatic remediation including to:
- obtain internal reference information associated with the violation; and
- update the internal reference information such that the configuration associated with the violation is no longer in violation of the updated internal reference information.

9. The system of claim 1, wherein to provide the remediation corresponding to the violation comprises to provide a manual remediation including to:
- obtain a template plan corresponding to the violation;
- customize the template plan based at least in part on parameters associated with the violation and internal reference information; and
- present the customized template plan at a user interface.

10. The system of claim 9, wherein providing the manual remediation further comprises to:
- obtain a user commitment to remediate the violation based on the customized template plan, wherein the user commitment comprises a remediation deadline;
- determine that the violation has not be remediated by the remediation deadline; and
- in response to the determination that the violation has not be remediated by the remediation deadline, send a prompt.

11. A method, comprising:
- detecting a violation associated with a configuration at a data source server, wherein detecting the violation associated with the configuration at the data source server comprises:
  - receiving an indication to perform an audit with respect to a policy;
  - obtaining stored mappings corresponding to the policy;
  - querying the data source server for configured security attributes of elements associated with the data source server with respect to a role group of the policy using the stored mappings;
  - obtaining prescribed security attributes corresponding to the stored mappings;
  - comparing the configured security attributes and the prescribed security attributes corresponding to the stored mappings based at least in part on a policy type and the role group of the policy;
  - determining that the violation exists based at least in part on the comparison between the configured security attributes and the prescribed security attributes;
- providing a remediation corresponding to the violation; and
- storing an audit log that includes one or more events associated with the remediation corresponding to the violation.

12. The method of claim 11, wherein the violation comprises a first violation, wherein the configuration comprises a first configuration, and further comprising detecting a second violation associated with a second configuration at the data source server comprises determining whether an actor related to the data source server is one or more of the following: has been inactive on the data source server for more than a predetermined period, does not have multi-factor authentication enabled, and has performed anomalous behavior.

13. The method of claim 11, wherein the violation comprises a first violation, wherein the configuration comprises a first configuration, and further comprising detecting a second violation associated with a second configuration at the data source server comprises:
- receiving a message associated with a cybersecurity event; and
- determining the second violation has occurred based at least in part on the message.

14. The method of claim 11, further comprising:
- determining whether the violation has been rendered moot; and
- in response to the determination that the violation has been rendered moot, omitting determining a severity corresponding to the violation.

15. The method of claim 11, wherein providing the remediation corresponding to the violation comprises providing an automatic remediation including:
- obtaining parameters associated with the violation;
- obtaining internal reference information associated with the violation;
- translating the violation into a set of application programming interface (API) commands based on the parameters and the internal reference information; and
- sending the set of API commands to the data source server.

16. The method of claim 11, wherein providing the remediation corresponding to the violation comprises providing an automatic remediation including:
- obtaining internal reference information associated with the violation; and
- updating the internal reference information such that the configuration associated with the violation is no longer in violation of the updated internal reference information.

17. The method of claim 11, wherein providing the remediation corresponding to the violation comprises providing a manual remediation including:
- obtaining a template plan corresponding to the violation;
- customizing the template plan based at least in part on parameters associated with the violation and internal reference information; and
- presenting the customized template plan at a user interface.

18. A computer program product embodied in a non-transitory computer readable medium and comprising computer instructions for:
- detecting a violation associated with a configuration at a data source server, wherein detecting the violation associated with the configuration at the data source server comprises:
  - receiving an indication to perform an audit with respect to a policy;
  - obtaining stored mappings corresponding to the policy;
  - querying the data source server for configured security attributes of elements associated with the data source server with respect to a role group of the policy using the stored mappings;
  - obtaining prescribed security attributes corresponding to the stored mappings;
  - comparing the configured security attributes and the prescribed security attributes corresponding to the stored mappings based at least in part on a policy type and the role group of the policy;
- determining that the violation exists based at least in part on the comparison between the configured security attributes and the prescribed security attributes;
- providing a remediation corresponding to the violation; and
- storing an audit log that includes one or more events associated with the remediation corresponding to the violation.

* * * * *

UNITED STATES PATENT AND TRADEMARK OFFICE
CERTIFICATE OF CORRECTION

PATENT NO. : 11,418,393 B1
APPLICATION NO. : 17/385422
DATED : August 16, 2022
INVENTOR(S) : Brian Soby and Timothy Bach Page 1 of 1

It is certified that error appears in the above-identified patent and that said Letters Patent is hereby corrected as shown below:

In the Claims

In Column 22, Line(s) 27, Claim 1, after "policy", delete ":", insert --;--, therefor.
In Column 22, Line(s) 31, Claim 1, after "mappings", delete ":", insert --;--, therefor.
In Column 22, Line(s) 33, Claim 1, after "mappings", delete ":", insert --;--, therefor.

Signed and Sealed this
Thirty-first Day of January, 2023

Katherine Kelly Vidal
*Director of the United States Patent and Trademark Office*